United States Patent [19]

Ort

[11] 3,768,901
[45] Oct. 30, 1973

[54] DEVICE FOR PICKING UP SLIDES
[75] Inventor: Wolfgang Ort, Stuttgart-Wangen, Germany
[73] Assignee: Eastman Kodak Company, Rochester, N.Y.
[22] Filed: July 1, 1971
[21] Appl. No.: 158,760

[30] Foreign Application Priority Data
Aug. 14, 1970 Germany.................. G 70 30 517.8

[52] U.S. Cl.................... 353/103, 206/1 A, 312/71, 353/DIG. 1
[51] Int. Cl......................... G03b 23/02, B65g 1/16
[58] Field of Search.................. 312/71 X; 206/1 X; 353/111, 112, 113, DIG. 1

[56] References Cited
UNITED STATES PATENTS
3,552,846  1/1971  Hansen............................... 353/103

Primary Examiner—Louis R. Prince
Assistant Examiner—Steven L. Stephan
Attorney—W. H. J. Kline et al.

[57] ABSTRACT

A slide projector includes a storage area for receiving slides aligned to form a stack. A movable pressure pad is urged toward a received slide stack to clamp the stack in the storage area between the pressure pad and wall means at oe end of the sotrage area. A removable device for picking up the stack of slides from the storage area includes a bracket member which defines a recess into which the slides are received when the device is moved onto the projector. At that time, cooperation between a cam surface on the device and the pressure pad moves the pressure pad away from the slide stack to release the clamping pressure on the stack. At that time, a clamp in the deivce is released from a restrained position to resiliently hold the slides in the recess of the bracket member so that the slide stack may be removed from the storage area with the device.

6 Claims, 7 Drawing Figures

Patented Oct. 30, 1973 3,768,901

WOLFGANG ORT
INVENTOR.

BY Milton S. Sales
W. W. J. Kline
ATTORNEYS

DEVICE FOR PICKING UP SLIDES

BACKGROUND OF THE INVENTION

1. Field of the Invention

The present invention relates to a device for picking up slides from the storage area of a projector.

2. Description of the Prior Art

Devices for storing a plurality of slides or film transparencies, for depositing the slides in the supply area of a projector and for receiving the slides after projection are well known in the art. Some such devices comprise two separable parts, a base and a cover, the cover being removable to be placed in the slide receiving area of the projector while the base is used to convey the slides to the supply mechanism. As the slides are projected, they are delivered one by one to the cover which is removed after the last slide has been projected. The base and the cover are then reunited to form a container for storing the slides.

In other prior art devices, containers are provided which serve as either a supply mechanism or a storage compartment for receiving projected slides. U.S. Pat. No. 3,495,902, which issued Feb. 17, 1970 in the name of Edward J. Michniewicz discloses a slide transparency cassette and a projector for receiving such cassettes of this general type. In the mechanism shown in that patent, slides are vertically stacked in the supply magazine, are indexed to a projection gate and are then moved to a position above a received cassette in the take-up area of the projector into which they dropped by gravity. After the last slide has been projected, the cassettes are removed and the supply cassette is placed in the storage area to serve as receiving means for the next set of slides to be projected. While apparatus of this general type is effective to gather slides loosely as they are emitted from the projection gate, it is sometimes ad-vantageous to provide means in the projector for positively clamping projected slides to eliminate any possibility of the slides being accidentally dropped should the projector be moved.

SUMMARY OF THE INVENTION

It is an object of the present invention to provide a device for picking up slides from the storage area of a projector of the type in which the slides are positively clamped by the provision of means on the device for releasing the clamp when the device is moved to a position encompassing the slides.

It is another object of the present invention to provide such a device with means for positively holding the received slides in the device so that the device may be removed from the projector and used to store the slides.

In accordance with the above objects, a preferred embodiment of the present invention includes a device for picking up slides from a storage area of a projector of the type having means for receiving the device and a pressure pad movable from a first set of positions in resilient contact with a stack of slides in the storage area to a second position spaced from the slide stack. The device includes a plurality of walls which define a recess having at least one open side through which at least a portion of each slide of the stack may enter the recess when the device is placed on the receiving means of the projector. A cam surface on one of the walls of the device cooperates with the pressure pad to move the pressure pad from its first set of positions to its second position when the device is placed on the receiving means of the projector. Means are provided on the device for releasably holding the stack of slides within the recess so that the slides are removed from the projector's storage area with the device.

The invention, and its objects and advantages, will become more apparent in the detailed description of the preferred embodiments presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because slide projectors are well known, the present description will be directed in part to elements forming part of or cooperating more directly with apparatus in accordance with the present invention. It is thereby understood that projector elements not specifically shown or described may take various forms well known to those skilled in the art.

Figure 1:
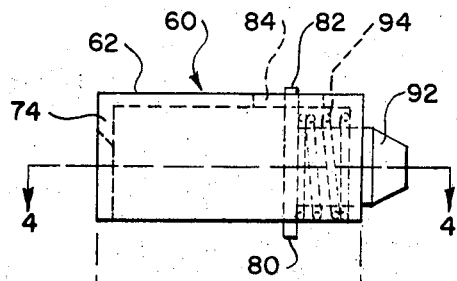
FIG. 1 shows a side elevational view of a portion of the slide storage area of a projector and of a device for picking up slides from the storage area in accordance with the present invention.
Figure 3:
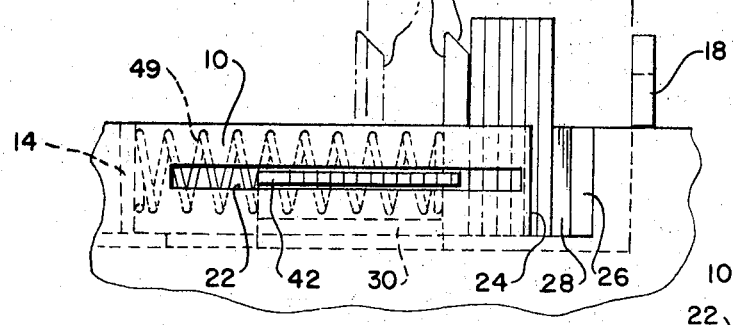
FIG. 3 is a sectional view taken along line 3—3 of FIG. 2.
Figure 2:
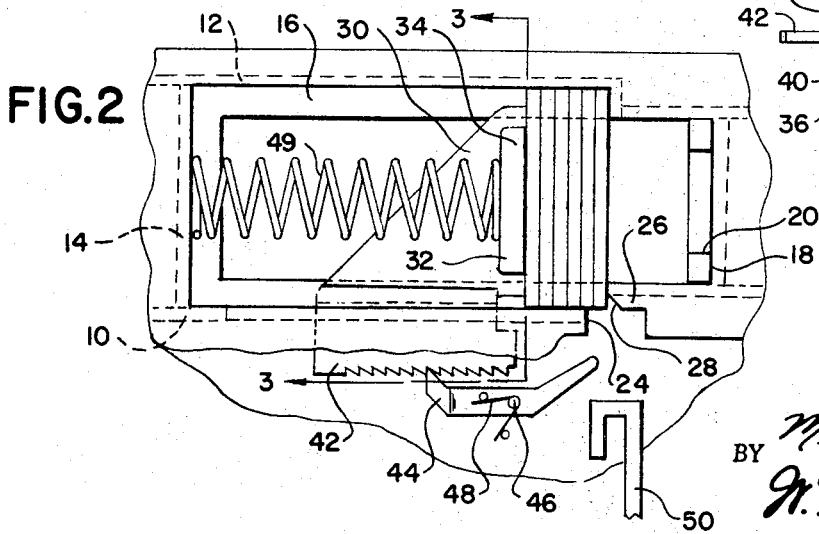
FIG. 2 is a top plan view of the portion of the projector shown in FIG. 1 and showing a portion of the slide changing mechanism.

A portion of a slide projector is shown in FIGS. 1–3 and includes wall means, of which walls 10 and 12 are side walls and wall 14 is a front wall, for defining a recess into which film transparencies or slides may be indexed to form a stack. A lower lip 16 on each of the walls defines the bottom of the recess. The rear of the recess includes an upstanding member 18 having a generally U-shaed notch 20 with converging sides. The function of member 18 and its notch 20 will be set forth in detail hereinafter. Side wall 10 has a horizontally extending opening 22 and a vertically extending opening 24 therein. Opening 24 is aligned with the rear of the slide stack. The rear edge of opening 24 is defined by a wall portion 26 having a beveled surface 28, the purpose of which will be made clear below.

A slide holding member 30 is longitudinally movable in the recess and includes a pressure pad 32 having a flat rearward surface for engagement with the front surface of the first slide to enter the recess. The top of pressure pad 32 has a beveled surface 34, the purpose of which will be set forth hereinafter. As will be best seen in FIG. 3, member 30 has a pair of lips 36 and 38 which ride upon the upper surface of lower lips 16. Lip 36 has a bent portion 40 with a toothed arm 42 extending through opening 22 in side wall 10 form movement along that side wall as pressure pad 32 is moved along the recess. A ratchet pawl 44 is pivotally mounted on the projector housing for rotation about a pin 46 by a torsion spring 48. A compression spring 49, mounted between front wall 14 and pressure pad 32 resiliently urges the pressure pad to the right as viewed in FIGS. 1 and 2 to clamp a stack of slides received in the recess between the pressure pad and the rear wall of the recess.

After being viewed in a normal manner, a slide is moved by a push member 50 from a projection gate, not shown, into engagement with beveled portion 28 of a wall portion 26 behind the corner of the last slide in the stack. As push member 50 continues to move the slide into alignment with the stack, the slides making up the stack are moved to the left as viewed in FIGS. 1 and 2 to make room for the incoming slide. Pressure pad 32 and member 30 are also moved to the left to accommodate the new slide. Ratchet tooth member 42 moves so that pawl 44 engages the next tooth. As pressure pad 32 moves, spring 49 is compressed. In the illustrated embodiment, I have provided space for twelve slides to be received to form the stack before they must be removed to a storage area to make room for the next projected slides. However, it will be understood that the apparatus may be dimensioned to receive any desired number of slides.

THE PICK-UP DEVICE

In order to remove the slide stack, I have provided a device for picking up the slides from the projector storage area. The device includes a bracket member 60 having a top wall 62, a pair of side walls 64 and 66, and a rear wall 68. The front of bracket 60 includes a pair of side portions 70 and 72 and a top portion 74. The top portion is beveled to mate with inclined surface 34 of pressure pad 32. Rear wall 68 of the bracket has a circular opening 78.

Figure 5:
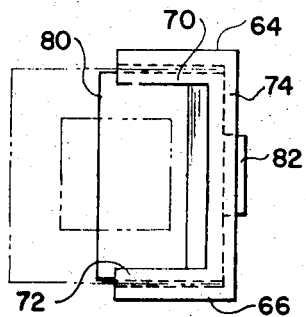
FIG. 5 is a front view of the device for picking up slides shown in FIG. 1.
Figure 4:
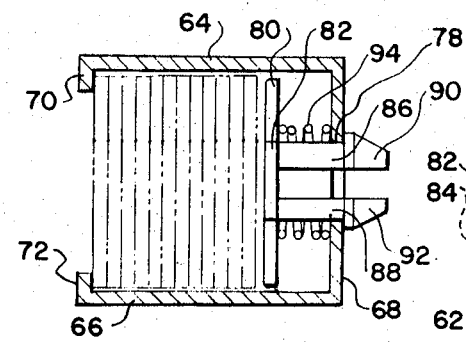
FIG. 4 is a sectional view of the pick-up device taken along line 4—4 in FIG. 1.
Figure 6:
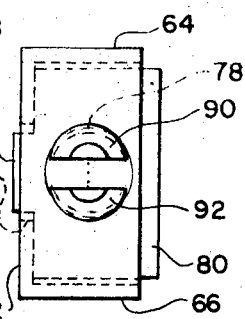
FIG. 6 is a rear view of the device for picking up slides shown in FIG. 1.

A rectangular plate 80 is movably mounted in bracket 60 and has a tab 82 which extends through an opening 84 in top wall 62 of the bracket to guide the plate therein. A pair of latch members including shaft parts 86 and 88 and latch parts 90 and 92, respectively, extend from the rear surface of plate 80 through circular opening 78 in rear wall 68. A compression spring 94 is mounted between plate 80 and rear wall 68 to resiliently urge pressure plate 80 to the left. Latch parts 90 and 92 engage the rear surface of wall 68 through opening 78 to hold plate 80 in the position shown in FIG. 4.

OPERATION OF A PICK-UP DEVICE

Figure 7:
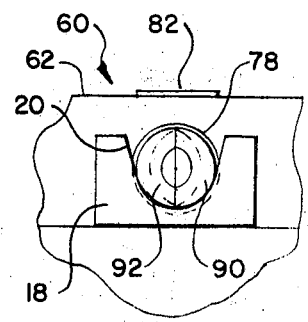
FIG. 7 is a rear view of a portion of the projector and the pick-up device.

When the maximum number of slides (twelve in the illustrated embodiment) have been received in the projector's storage area and it is desired to remove them therefrom, bracket 60 is aligned with the storage area as shown in FIG. 1. Plate 80 is held to the right against the force of spring 94 by latch portions 90 and 92. As the bracket is lowered about the slides, the beveled surface of front top wall 74 engages inclined surface 34 of pressure pad 32 to move the pressure plate to the left as viewed in FIG. 1. Upon movement of the pressure plate to the left, latch portions 90 and 92 are moved into U-shaped opening 20 of an upstanding member 18 and, cooperation between the latch portions and the converging edges of opening 20 close the latch portions opening themselves as shown in FIG. 7 until the latch portions can slide through opening 78 in rear wall 68 of the bracket. Pressure pad 34 is secured away from the slide track by ratchet pawl 44, and the slides are held in the pick-up device by plate 80 so that when the pick-up device is removed vertically from the projector, the slide stack accompanies it.

The projector storage area is now empty and ready to receive additional slides. As the next slide is indexed from the projection gate into the storage area, push rod 50 trips ratchet pawl 44 to permit spring 49 to return pressure pad 34 to the right into clamping engagement with that slide.

As can be seen from the above, I have provided a device for picking up slides from the storage area of a projector in which the slides are positively clamped. The pick-up device is provided with means for releasing the clamp in the projector storage area and for simultaneously engaging the slides to hold them in the pick-up device. Although I have shown by way of the preferred embodiment a device for handling 12 slides at a time, it will be understood by those skilled in the art that the mechanism may be easily modified to accommodate any reasonable number of slides.

The invention has been described in detail with particular reference to preferred embodiments thereof, but it will be understood that variations and modifications can be effected within the spirit and scope of the invention.

I claim:

1. For use with a projector of the type having 1. a slide storage area including means for receiving a stack of slides and 2. a pressure pad movable by spring means into clamping engagement with a received stack of slides and movable against the force of the spring means to an inactive position spaced from the slide stack; a device for picking up a received slide stack from the storage area, said device comprising:
    a plurality of walls defining a recess having at least one open side through which at least a portion of each slide of a received slide stack may enter said recess when said device is placed over the slide stack in the storage area of the projector;
    means, including a cam surface defined by one of said walls, for moving the projector's pressure pad against the force of the spring means from a position in clamping engagement with the slide stack to its inactive position when the device is placed over a slide stack received in the storage area of the projector; and
    means on said device for releasably holding the stack of slides in said recess.

2. A device as defined in claim 1 wherein said pressure pad moving means is adapted to permit the device to be placed over a received stack of slides so that at least a portion of each slide of the stack has entered said recess by a predetermined distance before the pressure pad is moved from clamping engagement with the slide stack.

3. A device as defined in claim 1 wherein:
    said plurality of walls comprise 1. a first wall adapted to overlie the stack of slides received in said recess and 2. a second wall depending from said first wall and adapted to be aligned with one end of the slide stack; and
    said one wall depends from said first wall parallel to and spaced from said second wall to be aligned with the other end of the slide stack.

4. A container as defined in claim 3 wherein said holding means comprises:
a plate;
means for movably mounting said plate in said recess parallel to said second wall;
means for resiliently urging said plate from a first position spaced from said first wall in a direction perpendicular to said second wall and toward said one wall for holding a stack of slides in said recess between said plate and said one wall; and
means for releasably latching said plate in its first position while said container is being moved toward the receiving means of the projector.

5. In a projector having a storage area for receiving slides aligned in parallel planes to form a stack, the combination comprising:
means defining a first surface parallel to the planes of received slides;
a pressure pad spaced from and resiliently urged toward said first surface for releasably clamping a stack of slides in the storage area between said first surface and said pressure pad;
a cam surface defined by said pressure pad;
a removable device for picking up a stack of slides received in the storage area, said device including 1. wall means defining a recess having at least one open side through which at least a portion of each slide of a received slide stack may enter said recess when said device is placed on the projector and 2. a cam surface defined by one of said walls and positioned on said device to cooperate with the cam surface of said pressure pad for moving said pressure pad away from said first surface when said device is placed on the projector.

6. The combination as defined in claim 5 further comprising:
means on said device for releasably holding the slide stack in said recess, said holding means including 1. a plate movable from an inactive position to an active position and 2. means for releasably latching said plate in its inactive position; and
means on said projector for releasing said latching means when said device is placed on said projector.

* * * * *